Figure 5:
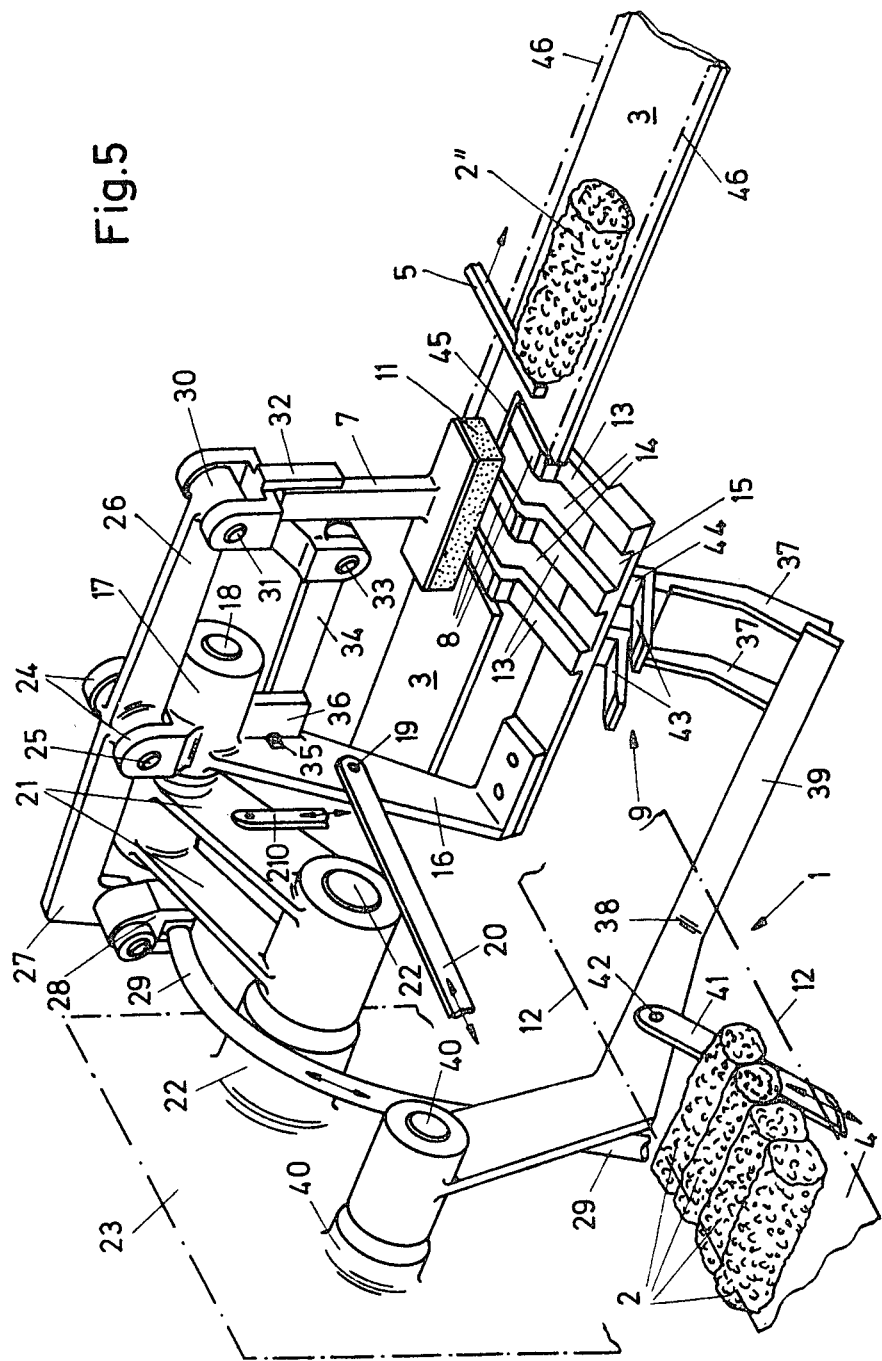

United States Patent
Fluck

[15] 3,638,777
[45] Feb. 1, 1972

[54] METHOD AND DEVICE FOR SEPARATING ARTICLES ARRANGED IN CLOSE SUCCESSION ON A CONVEYOR

[72] Inventor: Rene Fluck, Neuhausen am Rheinfall, Switzerland

[73] Assignee: Schwerzerische Industrie-Gesellschaft, Neuhausen am Rheinfall, Switzerland

[22] Filed: May 4, 1970

[21] Appl. No.: 34,075

[30] Foreign Application Priority Data

May 8, 1969 Switzerland ............................ 7029/69

[52] U.S. Cl. ............................................................. 198/20
[51] Int. Cl. ........................................................ B65g 47/00
[58] Field of Search ................................... 198/27, 20, 34, 24

[56] References Cited

UNITED STATES PATENTS

| | | | |
|---|---|---|---|
| 2,356,451 | 8/1944 | Evans | 198/27 |
| 2,816,647 | 12/1957 | Ruth | 198/34 |
| 2,404,460 | 7/1946 | Rolker | 198/179 |
| 3,217,858 | 11/1965 | Fellner | 198/24 |

*Primary Examiner*—Richard E. Aegerter
*Attorney*—Singer, Stern & Carlberg

[57] ABSTRACT

A method and device for separating closely successive articles which are fed by an input conveyor toward a packaging machine. Each article reaching the end of the input conveyor is transferred to a movable bottom member lying initially flush with the conveyor. A first vertically movable holding post holds the last article on the end of the conveyor while a second holding post engages the preceding article on the bottom member and when the latter is tilted with the second holding post and the article therebetween the two mentioned articles, which may stick together, are separated along an axis forming the line of contact between said articles. The preceding article is then transferred from the bottom member to a lower disposed stationary slide track extending at a right angle to the input conveyor. The second holding post releases the article which then is moved by a tappet along the slide track to a packaging machine.

8 Claims, 5 Drawing Figures

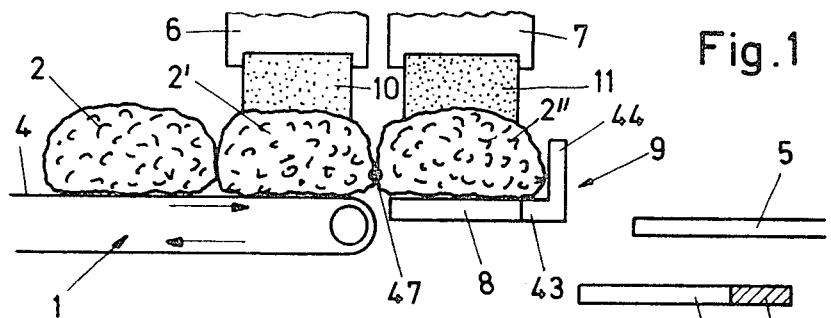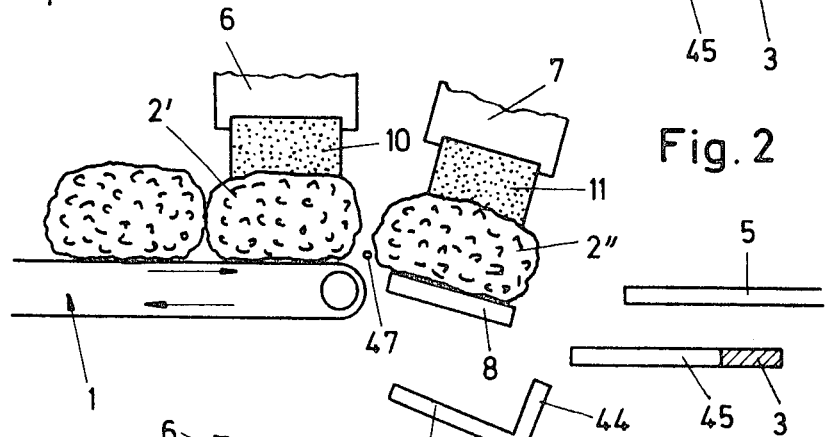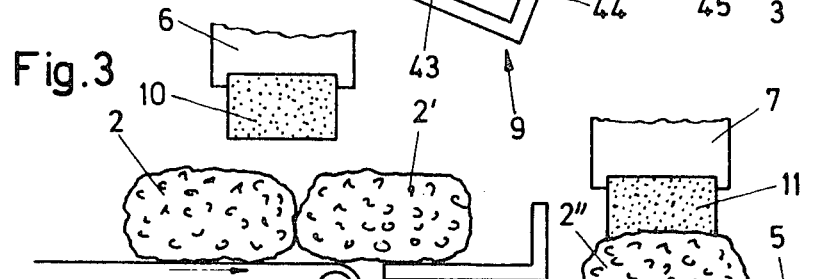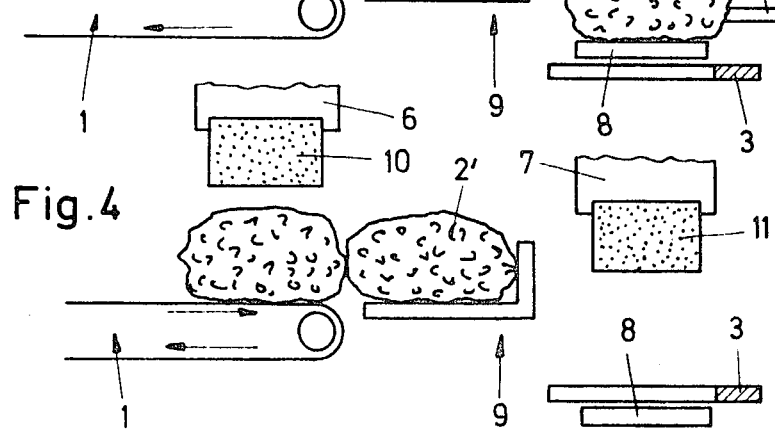

METHOD AND DEVICE FOR SEPARATING ARTICLES ARRANGED IN CLOSE SUCCESSION ON A CONVEYOR

The invention relates to a method for separating of consecutive articles carried by an input conveyor belt which, for instance, moves the articles on its way to a packaging machine. It is known to separate the articles when each of the same arrives at the ends of the input conveyor belt by a transverse or vertical slidable movement from the following articles. For certain articles—for instance, such articles which may stick together—this mentioned known method is not suitable. For overcoming this disadvantage, the method of the present invention is characterized in this, that in each individual article at the end of the conveyor belt is moved upon a movable bottom arranged in the extension conveyor belt and then holds this article against this bottom, whereupon a tilting of the bottom about the line of engagement with the following article takes place. The following article is likewise held in position and the tilted article rotates about said line of engagement which forms an ideal separation axis and thereby is separated from the following article and then is moved from the movable bottom to another conveyor where it is finally released.

The invention also relates to a device for practicing this method. The device is equipped with two holding posts of which the first one is mounted in a stationary guide and is used for engaging holding an article which has reached the end of the input conveyor belt. The second holding post is so arranged that it always moves at a right angle to a movable bottom which in turn is mounted on a pivoted lever whose pivot axis by means of an additional pivotal arm is movable about a stationary pivot axis, whereby the second holding post is used for holding an article placed on the mentioned bottom and moves the same on its way to an output conveyor track.

The drawing illustrates by way of example one embodiment of the invention.

In the drawings:

The FIGS. 1, 2, 3, and 4 illustrate a few parts of the separating device in four different operating cycles and, FIG. 5 illustrates diagrammatically and in a perspective view a portion of the separating device.

Referring to FIG. 1, the illustrated separating device comprises an endless conveyor belt 1 which is employed for feeding pressure-sensitive articles 2 which stick together and have an irregular surface, for instance, pieces of chocolate with projecting nut kernels. The articles 2 which on the input conveyor belt 1 are arranged in close succession and may even still stick to each other are to be transferred individually onto a stationary slide track 3 which extends at a right angle to the conveyor belt 1 and is disposed a small distance below the upper stretch 4 of the endless conveyor belt 1, whereby the articles 2 are carried by this upper stretch 4. The articles 2 are moved along the track 3 by horizontal tappets 5 which are secured on a not-illustrated endless chain. In order to transfer the articles 2 onto the track 3 there are provided two vertical holding posts 6 and 7, a movable bottom member 8 and a movable abutment member 9. The holding posts 6 and 7 are provided at their lower ends with soft-elastic cushions 10 and 11, respectively, consisting for instance of foam rubber. In the position illustrated in FIG. 1 the holding posts 6 and 7 are in an operative position and press upon the upper face of the articles 2.

The holding post 6 has to perform solely an upward and downward movement in order to hold the articles 2' under it in engagement with the conveyor belt 1. This article 2' lies at the discharge end of the upper stretch 4 of the endless conveyor belt 1. In order to perform this function, the holding post 6 requires solely to be guided and operated in a stationary vertical guide on the machine. In FIG. 5, all of the just mentioned parts have been omitted in order to clearly illustrate the other holding post 7. In FIG. 5 the holding post 6 with its guide and its drive elements is arranged in front of the holding post 7. FIG. 5 solely illustrates the longitudinal edges 12 of the upper stretch 4 of the conveyor belt 1 in dash and dotted lines, and furthermore, FIG. 5 also illustrates a few articles 2 which are still very far away from the holding post 7.

The bottom member 8 is formed by the ends of three parallel fingers 13 which extend with spaces therebetween at a right angle from an arm 15. This arm 15 is fixed at a right angle to one end of a lever 16 pivotally mounted at its other end with a hub 17 to a pivot pin 18 whose pivot axis is arranged parallel to the arm 15. The lever 16 has pivotally attached thereto between its ends at 19 an operating rod 20. The pivot pin 18 is secured to one end of a pivot lever 21 whose other end is pivotally supported by a shouldered pin 18 which is fixedly attached to the frame 23 of the machine. The lever 21 is adapted to be rocked by an operating rod 210 attached to a point between the ends of the lever 21.

The hub 17 of the lever 16 is integrally formed with a forked bearing 24 which receives a pivot pin 25 extending crosswise of the pivot pin 18 and supports a lever 26 between its ends. The end 27 of the lever 26 is connected by a universal joint 28 with an operating rod 29. At the other end 30 of the lever 26 is pivotally mounted a mount 32 for the upper end of the holding post 7. The mount 32 is also connected between its ends at 33 with a connecting rod 34 which extends substantially horizontally and is connected at 35 with a projection 36 which is fixed to the lever 16. The pivot axes 25, 31, 33 and 35 form the corners of a parallelogram which is disposed in a plane which is vertical to the bottom member 8, so that when the rod 29 is actuated, the holding post 7 is moved up and down always vertically with respect to the three-part bottom member 8, namely during each operation of the rod 20 which determines the pivotal position of the lever 16.

The movable abutment member 9 is formed by the ends of two spaced parallel fingers 37 which are fixedly attached to the horizontal arm 39 of an angular lever which is pivotally supported on a shoulder pin 40 fixedly attached to the frame 23 of the machine. For pivotally moving the arm 29 is employed an operating rod 41 which is pivotally attached to the angular portion of the arm 39 between its ends at 42. The two-part movable member 9 comprises a receiving bar 43 at a right angle thereto and an abutment bar 44 which, of course, is also provided in two parts.

The horizontal stationary slide track 3 is provided in one of its edges with a rectangular recess 45 through which the bottom member 8 may be moved up and down. In FIG. 5, the bottom member 8 is illustrated to be in the same level as the track 3, so that an article (not shown) which may be on this bottom member 8 will be engaged by a tappet 5 and moved along the track 3 as is indicated by the article 2''. Two relatively low sidewalls 46—indicated in dash and dotted lines—extend along the track 3 and prevent a lateral displacement of the articles and even a dropping of the articles from the track 3.

In FIG. 5 the bottom member 8 is illustrated in an intermediate position between the position shown in FIGS. 3 and 4 and the abutment member 9 is substantially in the position shown in FIG. 2. The positions of the parts 8 and 9 in FIG. 5 do not occur simultaneously but are only illustrated for the sake of a better understanding of the operation of the device. The operating rods 20, 210, 29 and 41 may be operated by means of cams and other movement transmitting members which are driven by a drive shaft in such a manner that the articles 2—as will now be explained with reference to the FIGS. 1 and 4—will be separated from each other and will be further transported, for instance, to a packaging machine.

At the beginning of an operating cycle the bottom member 8 and the abutment member 9 are in the position illustrated in FIG. 1. That is, the levers 21 and 16 by means of their operating rods 210 and 20 are pivoted to such a position that the bottom member 8 will be located just behind the discharge end of the upper stretch 4 of the conveyor belt 1 and the lever 39 has been pivoted by the rod 41 into such a position that its fingers 37 are disposed below the spaces 14 between the fingers 13 of the lever 16, so that the two parts of the receiving bar 43 of the abutment member 9 will lie between the three parts of the bottom member 8, while the abutment bar 44 is disposed directly in rear of the same. Owing to the movement of the conveyor belt 1 one article 2'' has been slidably moved onto the bottom member 8 up to the abutment bar 44. Now the holding posts 6 and 7 with their cushions 10 and 11 are moved downwardly upon the articles 2' and 2" as also shown in FIG. 1, whereby the holding post 7 is actuated by the rod 29.

During the time the article 2' is held by the holding post 6 on the conveyor belt 1, which during this time is stationary, the other article 2" which is held between the bottom member 8 and the holding post 7 is tilted downwardly by a pivotal movement of the levers 21 and 16 as shown in FIG. 2, whereby the ideal corresponding axis 47 is located at the end of the upper stretch 4 of the conveyor belt 1 and extends transversely to the stretch 4 and for all practical purposes is located where the articles 2' and 2" touch each other. At the same time the abutment member 9 is lowered with reference to the bottom member 8. The axis of rotation of the pivot pin 22 is in axial alignment with the ideal tilting axis 47.

FIG. 3 illustrates that the holding post 7 and the bottom member 8 transport the article 2" held between the same to a position above the track 3, while at the same time the abutment member 9 returns to its operating position and the holding post 6 releases the article 2' which now owing to the action of the conveyor belt 1 is slidably moved onto the horizontal bar 43, whereupon the holding post 7 and the bottom member 8 are actuated, the article 2" is released and is lowered onto the track 3. A tappet will now engage the article 2" and moves it along the track 3. At the same time, as shown in FIG. 4, the article 2' has been moved against the bar 44.

Now the bottom member 8 and the holding posts 6 and 7 return into the position illustrated in FIG. 1 and during the next operating cycle the article 2' is brought upon the track 3.

The described separating device separates very protectively and dependably because the two articles 2' and 2" between which in each case a separation is accomplished are held softly during the separation and there exists no possibility that the articles may slip outwardly or may be damaged, even if they should stick together. Also articles 2 having a small height may be separated without the possibility that they roll one over the other. Obviously, the tappets need not be arranged in a horizontal plane, they may also be arranged vertically and may be projecting through a longitudinal slot in the track 3 which for this purpose in the range of the bottom member 8 is suitably shaped so that the articles 2 may be received and at the same time permit the passage of the tappets.

What I claim is:

1. Method of separating an end article from a row of articles adhering to each other, comprising the steps of moving said row of adhering articles on an input conveyor in the longitudinal direction of said row until the leading article rests upon a base member at the discharge end of said input conveyor, clamping said leading article to said base member, clamping the neighboring article in the row to said input conveyor, tilting said base member about a transverse horizontal axis disposed approximately in a transverse vertical plane through the adhering surfaces of said leading and neighboring articles thereby separating said leading article from said neighboring article, releasing said leading article from said base member, and transferring said leading article onto an adjacent receiving and moving means.

2. Device for separating an end article from a row of articles adhering to each other, comprising an input conveyor supporting said row of articles and movable in the longitudinal direction of said row, a base member adjacent to the discharge end of said input conveyor, first clamping means for holding said leading article on said base member, second clamping means for holding the neighboring article of the row on said input conveyor, means for tilting said base member and first clamping means about a transverse horizontal axis disposed approximately in a transverse vertical plane through the adhering surfaces of said leading and neighboring articles to thereby separate said leading article from said neighboring article, and an article receiving and moving means adjacent to said base member and adapted to remove said leading article from said base member upon release of said first clamping means, said tilting means including a lever mounted to pivot about a stationary axis substantially aligned with said transverse horizontal axis, and means pivotally connecting said lever to said base member and first clamping means.

3. Device according to claim 2, in which said base member comprises a plurality of spaced parallel fingers, a pivotally mounted lever being provided with members loosely fitting and insertable between said fingers, and abutment means on said members in a position to extend above said base member when said members are disposed between said fingers, whereby said abutment means serve to limit the movement of said leading article onto said base member.

4. Device according to claim 2, in which said first clamping means for movement to and from clamping position is connected to a parallelogram linkage means mounted on said tilting means lever.

5. Device according to claim 2, including soft yieldable cushion means secured to the article engaging portions of said first and second clamping means.

6. Device according to claim 2, in which the input conveyor comprises the upper run of an endless conveyor belt.

7. Device according to claim 2, in which said article receiving and moving means comprises a pusher-type conveyor mounted transversely of said input conveyor.

8. Device for separating an end article from a row of articles adhering to each other, comprising an input conveyor supporting said row of articles and movable in the longitudinal direction of said row, a base member adjacent to the discharge end of said input conveyor, first clamping means for holding said leading article on said base member, second clamping means for holding the neighboring article of the row on said input conveyor, means for tilting said base member and first clamping means about a transverse horizontal axis disposed approximately in a transverse vertical plane through the adhering surfaces of said leading and neighboring articles to thereby separate said leading article from said neighboring article, and an article receiving and moving means adjacent to said base member and adapted to remove said leading article from said base member upon release of said first clamping means, said tilting means including a first lever mounted to pivot about a stationary axis substantially aligned with said transverse horizontal axis, and means pivotally connecting said first lever to said base member and first clamping means, and said base member comprising a plurality of spaced parallel fingers, a pivotally mounted second lever being provided with members loosely fitting and insertable between said fingers, and abutment means on said members in a position to extend above said base member when said members are disposed between said fingers, whereby said abutment means serve to limit the movement of said leading article onto said base member.

* * * * *